(12) United States Patent
Caliskan et al.

(10) Patent No.: US 7,441,831 B2
(45) Date of Patent: Oct. 28, 2008

(54) METHOD OF MANUFACTURING A VEHICLE FRAME MEMBER WITH A SUBFRAME ATTACHMENT MOUNT

(75) Inventors: Ari Caliskan, Canton, MI (US); Dean Gericke, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/838,872

(22) Filed: Aug. 14, 2007

(65) Prior Publication Data

US 2008/0018139 A1 Jan. 24, 2008

Related U.S. Application Data

(62) Division of application No. 11/148,027, filed on Jun. 8, 2005, now Pat. No. 7,275,785.

(51) Int. Cl.
*B62D 21/02* (2006.01)
(52) U.S. Cl. ............ 296/205; 296/203.01; 296/204; 296/29; 296/30; 29/897.2
(58) Field of Classification Search ............ 296/203.01, 296/203.02, 203.04, 204, 205, 29, 30, 187.08, 296/187.09, 187.11, 193.07–193.09; 29/897.2, 29/421, 525.01, 525.11, 525.14
See application file for complete search history.

(56) References Cited

U.S. PATENT DOCUMENTS

| | | | |
|---|---|---|---|
| 1,697,498 A | 1/1929 | Fageol | |
| 2,248,344 A | 7/1941 | Epps | |
| 2,270,533 A | 1/1942 | Knutte | |
| 4,986,597 A | 1/1991 | Clausen | |
| 5,215,343 A | 6/1993 | Fortune | |
| 6,003,935 A * | 12/1999 | Kalazny | 296/204 |
| 6,022,070 A | 2/2000 | Ashina et al. | |
| 6,302,478 B1 | 10/2001 | Jaekel et al. | |
| 6,378,444 B1 * | 4/2002 | Dastas et al. | 105/396 |
| 6,398,292 B2 * | 6/2002 | Tsuruta et al. | 296/187.09 |
| 6,434,907 B1 * | 8/2002 | Simboli | 52/731.6 |
| 6,435,584 B1 * | 8/2002 | Bonnville | 296/35.1 |
| 6,945,591 B2 * | 9/2005 | Durand | 296/183.1 |
| 6,948,767 B2 * | 9/2005 | Makita et al. | 296/187.09 |
| 6,991,284 B2 * | 1/2006 | Kim | 296/204 |
| 7,213,873 B2 * | 5/2007 | Murata et al. | 296/204 |
| 7,216,924 B2 * | 5/2007 | Li et al. | 296/187.12 |
| 2006/0284449 A1 * | 12/2006 | Miyahara | 296/204 |
| 2007/0138838 A1 * | 6/2007 | Caliskan et al. | 296/204 |

* cited by examiner

*Primary Examiner*—D. Glenn Dayoan
*Assistant Examiner*—Greg Blankenship
(74) *Attorney, Agent, or Firm*—Gregory Brown; Miller Law Group, PLLC

(57) ABSTRACT

An attachment mount apparatus connects a subframe component to the lower frame midrail structure for an automotive vehicle that is formed from a pair of tubular members manufactured through a hydroforming process. The two tubular members are formed with a pair of opposing semi-cylindrical depressions to receive a cylindrical mounting member internally of the frame structure. One of the semi-cylindrical depressions and the corresponding outer wall of the tubular member are pierced to receive the cylindrical mount and a mounting plate. The opposing semi-cylindrical depression serves as a stop to locate the cylindrical mount along the centerline of the frame structure. The mounting plate spans the entire frame structure and is supported on four wall thicknesses to provide a stable mount structure for subframe components. The cylindrical mounting member is threaded to receive a fastener for the mounting of the subframe member.

20 Claims, 4 Drawing Sheets

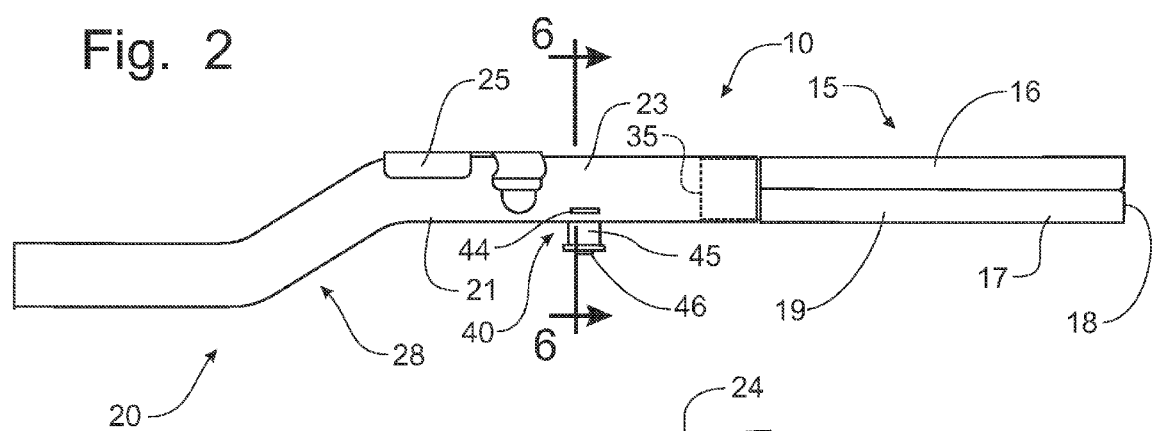
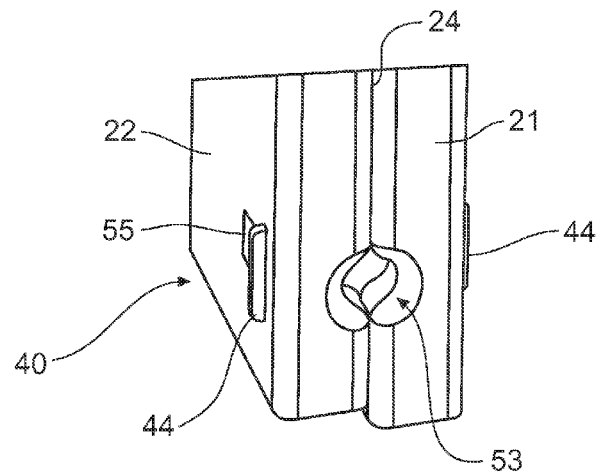

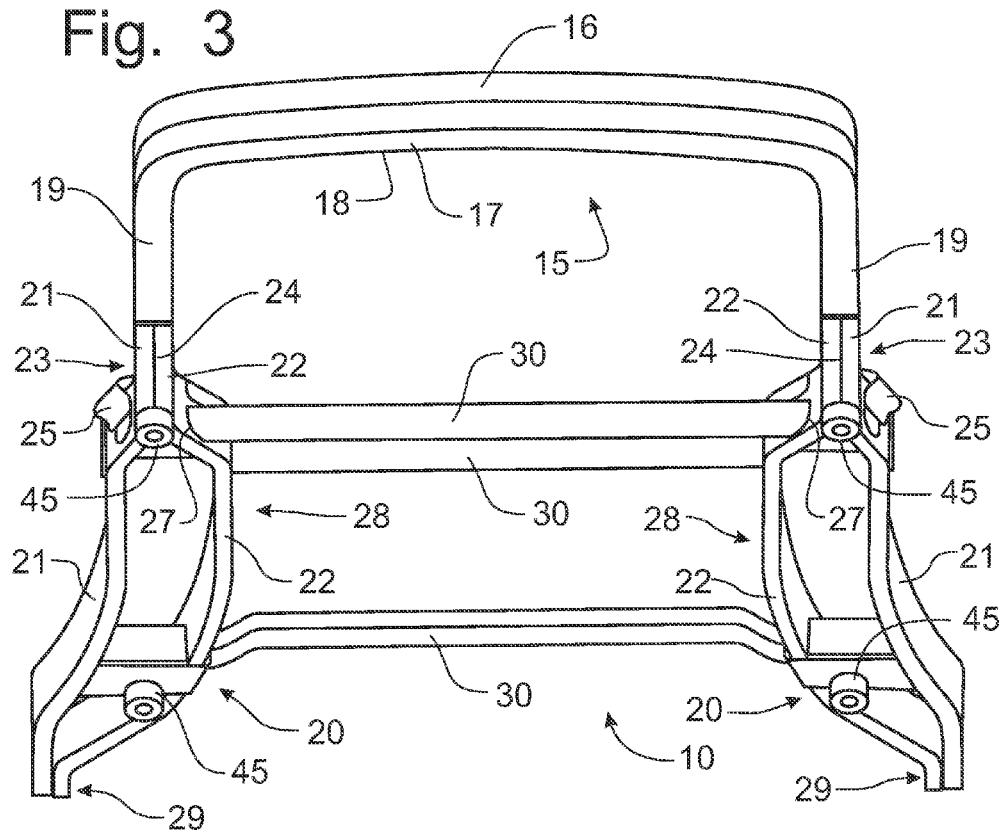
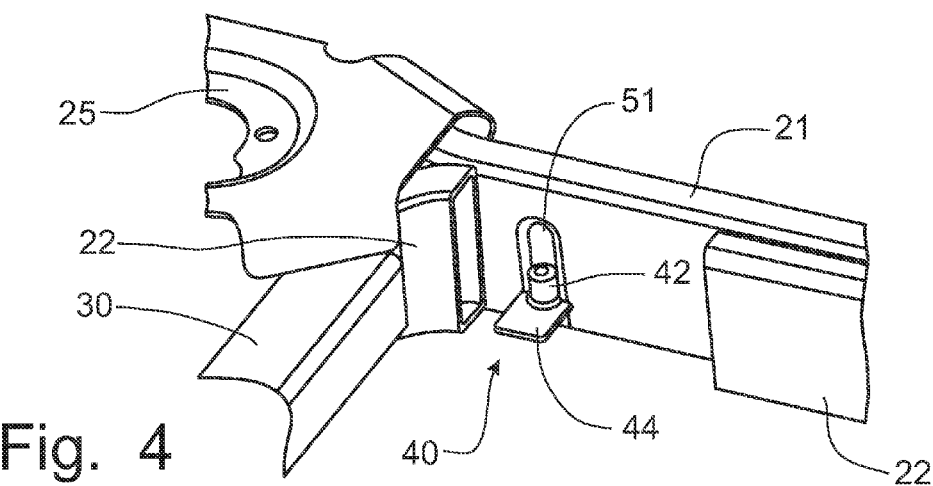

METHOD OF MANUFACTURING A VEHICLE FRAME MEMBER WITH A SUBFRAME ATTACHMENT MOUNT

CROSS-REFERENCE TO RELATED APPLICATIONS

This application is a divisional of U.S. patent application Ser. No. 11/148,027, filed Jun. 8, 2005, now U.S. Pat. No. 7,275,785.

FIELD OF THE INVENTION

This invention relates to lower frame midrails for an automotive vehicle and, more particularly, to a mount assembly for attaching subframe structures to a hydroformed midrail assembly formed from a pair of side-by-side tubular members.

BACKGROUND OF THE INVENTION

Lower frame midrails in an automotive vehicle support the central part of an automotive chassis and provide a cantilevered support for the rear bumper assembly. Conventionally, the rear bumper assembly would include a transverse bumper beam, lower frame rails and appropriate attachment brackets for connecting the bumper beam to the lower frame rails and the lower frame rails to the midrails. The rear shock tower support members are mounted on top of the midrails, conventionally in a cantilevered manner off of a single fabricated rail structure.

Conventional automotive frame designs are formed from fabricated steel components that are provided with many reinforcements affixed to the frame to accommodate the attachment of subframe components to the frame structure. The reinforcements permit the localized loads coming from subframe structures or other secondary structures to be transmitted into the frame structure without distortion of the frame. The formation of frame structure, such as the lower midrail frame structure from tubular hydroformed components, provides unique opportunities for the support and mounting of subframe components from a hydroformed frame structure.

Conventional clamps and brackets for attaching apparatus to frame structure can be found in U.S. Pat. No. 1,697,498, issued to Rollie B. Rageol on Jan. 1, 1929; and in U.S. Pat. No. 2,248,344, issued to Louis J. Epps on Jul. 8, 1941, where structure is mounted to tubular bumper components; in U.S. Pat. No. 2,270,533, issued to Joseph F. Knutte on Jan. 20, 1942; and in U.S. Pat. No. 5,215,343, issued to William C. Fortune on Jun. 1, 1993, where components are mounted to non-tubular bumper components. Clamping frame components together with couplings that become welded to the tubular frame members is taught in U.S. Pat. No. 6,022,070, issued to Toshiro Ashina, et al on Feb. 8, 2000.

Hollow tubular members are used as reinforcements for an automotive frame structure in U.S. Pat. No. 4,986,597, issued to Edvin L. Clausen on Jan. 22, 1991. Hydroformed automotive frame components are disclosed in U.S. Pat. No. 6,302,478, issued to Federico G. Jackel, et al on Oct. 16, 2001. In the Jackel frame structure, the hydroformed components are manufactured with flanges that will at least partially encompass a frame or subframe part to be joined thereto to facilitate the welding of the two components through the interaction with the flange components.

It would be desirable to provide an apparatus for the mounting of subframe structural components to the lower frame midrails. Since the lower frame midrails are to be formed from a pair of vertically oriented, but horizontally disposed tubular components, a unique apparatus to be particularly adaptable for use in conjunction with the lower frame rail structure of an automobile that are particularly adaptable to manufacturing through hydroforming processes and which can be utilized to provide a stable support for the rear shock tower.

SUMMARY OF THE INVENTION

It is an object of this invention to overcome the aforementioned disadvantages of the known prior art by providing an attachment mount to be supported by a lower frame midrail structure that is formed from a pair of tubular members.

It is a feature of this invention that the lower frame midrail structure can be formed through hydroforming processes to enhance manufacturing efficiencies.

It is an advantage of this invention that the hydroformed lower frame midrail structure is formed to receive a cylindrical subframe mount structure within the interior of the dual tube midrail structure.

It is still another advantage of this invention that the attachment mount cans be welded to both of the tubular members of the lower frame midrails to increase stability of the subframe mount.

It is still another feature of this invention that the subframe mounting structure is supported by both outer walls of the hydroformed lower frame midrail structure and by the interior adjoining walls thereof.

It is a further feature of this invention that the interior walls of the dual tube lower frame midrail structure is formed with a semi-cylindrical indentation to receive the cylindrical subframe mount along the centerline of the midrail structure.

It is a further advantage of this invention that an opening is pierced through the midrail structure to permit the attachment mount to be inserted into the midrail structure.

It is another feature of this invention that one tubular member of the midrail structure is pierced to permit the insertion of a cylindrical subframe mount, while the opposing semi-cylindrical depression serves as a stop for the lateral movement of the attachment mount for accurate placement of the mount at the centerline of the midrail structure.

It is still another feature of this invention that the cylindrical member of the attachment mount is threaded to receive a fastener attaching the subframe component to the midrail structure.

It is still another advantage of this invention that the attachment mount apparatus can be utilized between any hydroformed tubular members that are joined together to form a component to which a subcomponent needs to be attached.

It is yet another feature of this invention that the attachment mount apparatus eliminates reinforcement stampings conventionally required for use in mounting subcomponents to an automotive frame structure.

It is yet another advantage of this invention that the support of the mounting plate of the subframe mount apparatus on four wall thicknesses in the dual tube frame structure should reduce weight, yet provide for a stiffer support for the subcomponent on the frame structure.

It is another object of this invention to provide an attachment mount apparatus for use with a dual tube frame structure that is durable in construction, inexpensive of manufacture, facile in assemblage, and simple and effective in use.

These and other objects, features and advantages are accomplished according to the instant invention by providing an attachment mount apparatus for connecting a subframe component to the lower frame midrail structure for an automotive vehicle that is formed from a pair of tubular members manufactured through a hydroforming process. The two tubular members are formed with a pair of opposing semi-cylindrical depressions to receive a cylindrical mounting member internally of the frame structure. One of the semi-cylindrical depressions and the corresponding outer wall of the tubular member are pierced to receive the cylindrical mount and a mounting plate. The opposing semi-cylindrical depression serves as a stop to locate the cylindrical mount along the centerline of the frame structure. The mounting plate spans the entire frame structure and is supported on four wall thicknesses to provide a stable mount structure for sub-frame components. The cylindrical mounting member is threaded to receive a fastener for the mounting of the sub-frame member.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a side elevational view of the bumper and lower frame rail structure depicted in FIG. 1;

FIG. 3 is a bottom perspective view of the bumper and lower frame rail structure shown in FIG. 1;

FIG. 4 is an enlarged perspective detail view of a portion of the lower frame midrail with a portion of one of the tubular members forming the midrail being broken away to better see the mounting apparatus;

FIG. 5 is an enlarged bottom perspective view of a portion of the lower frame midrail to depict the opening into the midrail to engage the mounting apparatus;

DETAILED DESCRIPTION OF THE PREFERRED EMBODIMENT

Figure 1:
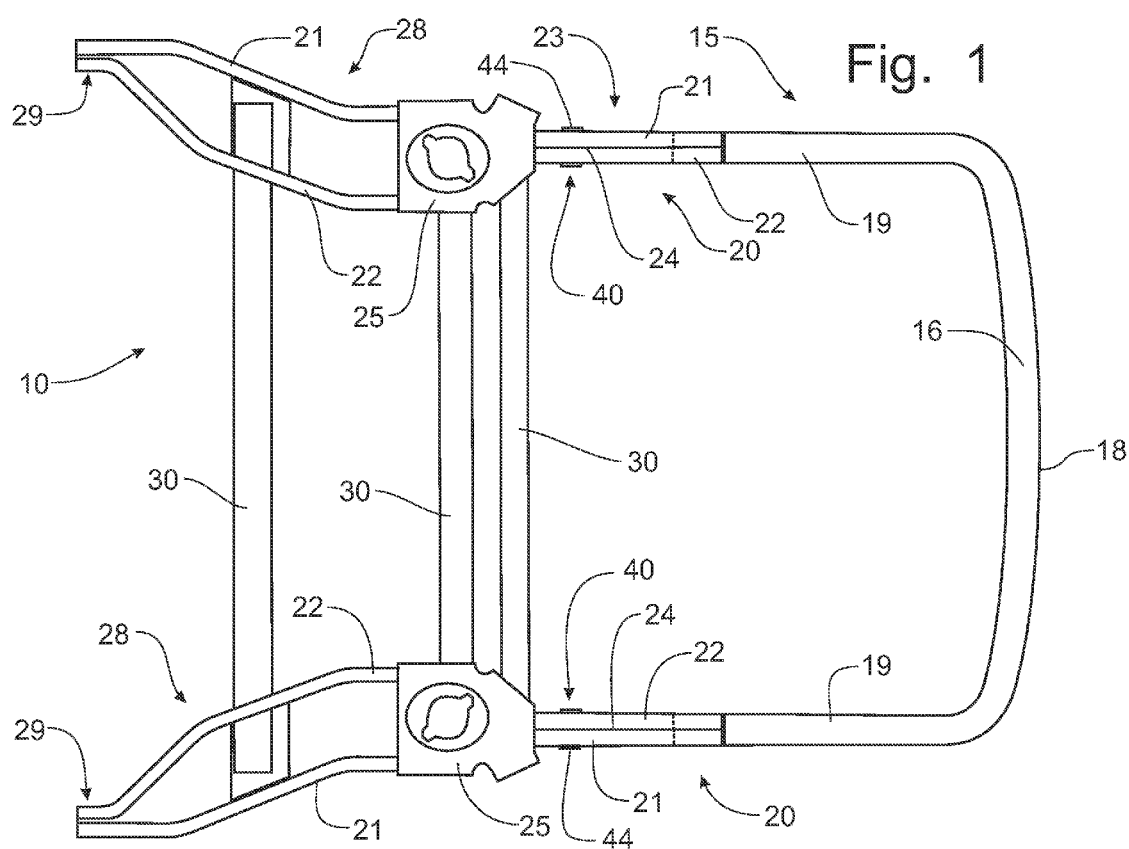
FIG. 1 is a top plan view of the single component bumper and lower frame rail structure to form the rear frame structure for an automobile incorporating the principles of the instant invention.
Figure 6:
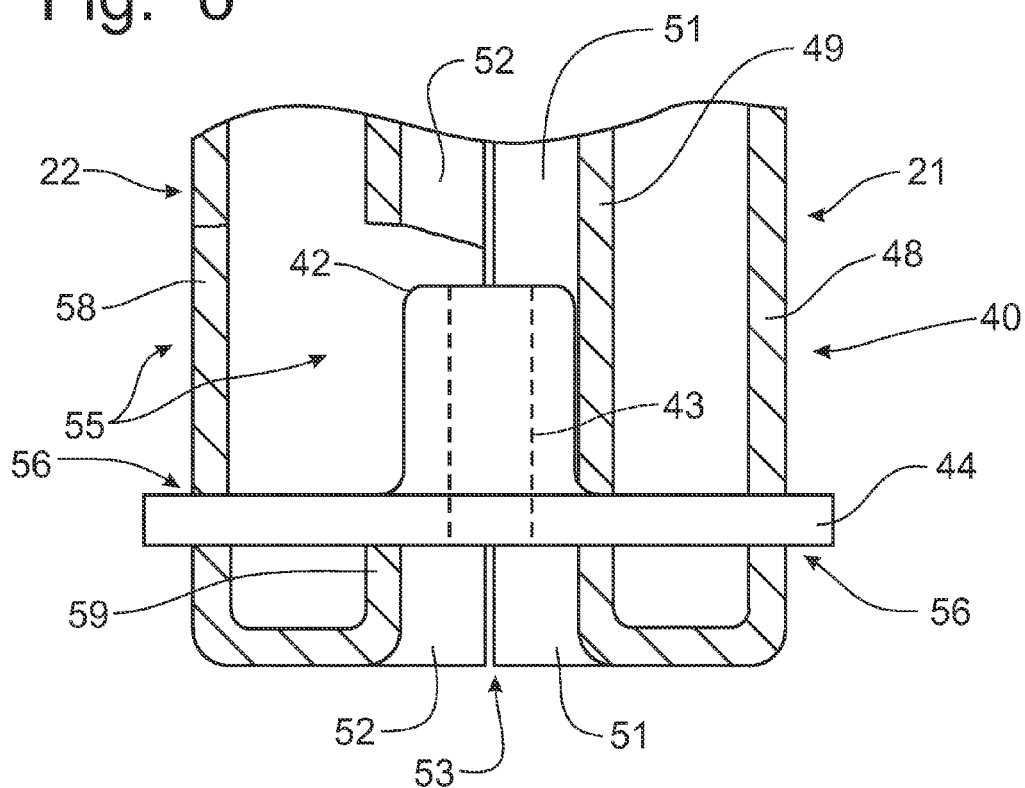
FIG. 6 is an enlarged partial cross-sectional view of the lower frame midrail taken along lines 6-6 of FIG. 2 to show an internal elevational view of the mounting apparatus incorporating the principles of the instant invention.
Figure 7:
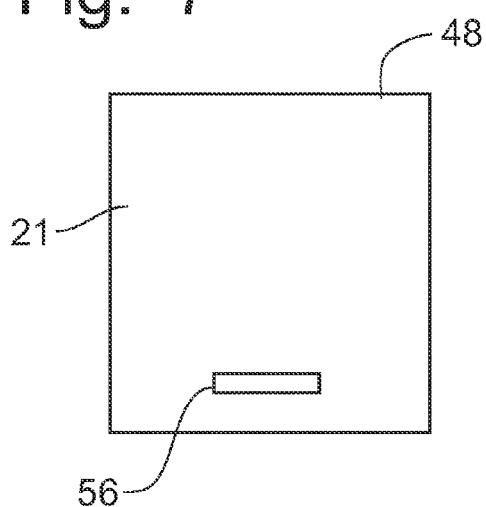
FIG. 7 is an elevational view of a portion of the exterior side of the lower frame midrail at the mounting apparatus.
Figure 8:
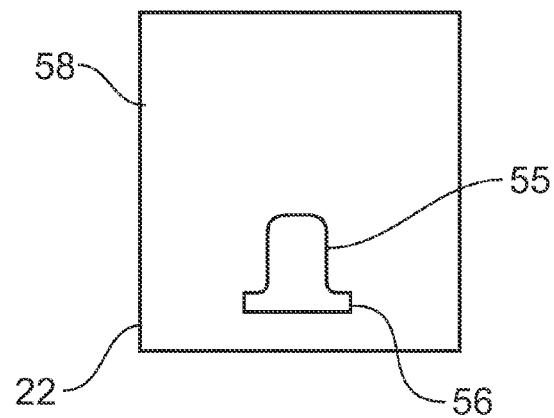
FIG. 8 is an elevational view of a portion of the interior side of the lower frame midrail at the mounting apparatus.

Referring to FIGS. 1 and 2, a bumper and lower frame rail, including a shock tower support, forming a part of the rear end of an automobile frame and incorporating the principles of the instant invention, can best be seen. The frame 10 of the automobile is preferably formed from hydroformed tubular members. Such tubular members can be spot-welded and/or MIG-welded to form an integral frame assembly for the rear end of a vehicle.

Hydroforming is a process by which a standard tubular stock member is placed into a form shaped to correspond to the particular member to be formed and to correspond to the particular section required for the frame design. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. One skilled in the art will readily recognize that some MIG-welding will be required in areas where access holes are detrimental to the integrity of the frame structure. Preferably, such MIG-welding processes are performed at a sub-assembly or at a supplier level.

In the automotive rear end frame 10 depicted in the drawings, the bumper 15 is formed from welded hydroformed members. Similarly, the lower frame rails 20, which connect to the bumper 15 and project forwardly therefrom, are formed from tubular hydroformed members. The shock tower support member 25 is preferably a stamping that is formed into a specific shape and mounted on the lower frame rails 20, as is described in greater detail below.

The lower frame rail 20 is formed from two hydroformed tubular members 21, 22 that have corresponding first longitudinally extending portions 23 that are welded together at the rearwardmost end of the members 21, 22 preferably by MIG-welding along the generally horizontal seam between the members 21, 22. As is best seen in FIGS. 1 and 3-6, the lower frame rail structure 20 would then have an internal vertical web 24 formed from the adjacent sidewalls of the two tubular members 21, 22, oriented as an exterior member 21 and an interior member 22. The internal web 24 substantially increases the strength and stiffness of the lower frame rail 20, compared to a conventional tubular member.

The longitudinally extending portions 23 are positioned for connection to the bumper 15. Forwardly of the longitudinally extending portions 23, the two tubular members 21, 22 diverge to define a divergent portion 28 to provide a lateral spacing between the two members 21, 22. At this point of divergence, the shock tower support 25 is affixed, preferably by welding, to the top of the two tubular members 21, 22. The tubular members 21, 22 converge into a second longitudinally extending portion 29 forward of said divergent portion 28.

Preferably, as is best seen in FIG. 3, at least one of the cross frame members 30 adjacent the shock tower support 25 will pass through appropriate openings 27 in the interior tubular member 22 to engage the exterior tubular member 21 to permit welding between both members 21, 22 and the cross frame member 30. Such fabrication will add cross-vehicle stiffness to the frame 10, as well as provide a robust joint at the shock tower support 25. Preferably, the interior and exterior tubular members 21, 22 converge so that the lower frame rail 20 will extend forwardly with a central vertical web 24, as is shown with respect to the rearward longitudinally extending portions 23.

The bumper 15 can also be constructed from two hydroformed members 16, 17, with the upper tubular member 16 being located on top of the lower tubular member 17. Preferably both tubular bumper members 16, 17 are shaped substantially identically with a rearwardly positioned bight portion 18 and opposing mounting legs 19. The two tubular members 16, 17 can be MIG-welded along the generally horizontally extending seam therebetween to form a dual-celled bumper 15. Formation of the tubular members through the hydroforming process permits the introduction of deformation triggers (not shown), i.e. fold points to direct the deformation of the bumper in a prescribed manner when encountering an impact load.

As best seen in FIG. 1, the forward ends of the mounting legs 19 are formed to mate with the dual tube lower frame rails 20. Each tubular member 16, 17 is formed with a reduced-sized terminal end 35 that can fit between the interior and exterior sidewalls of the lower frame rails 20, whereas the remainder of the mounting legs 19 are formed to correspond geometrically with the longitudinally extending portions 23 of the lower frame rails 20. As a result, the insertion of the reduced-sized terminal end 35 into the rearward ends of the lower frame rails 20 results in a generally uniformly shaped frame 10 with the overall width and depth of the bumper structure 15 being substantially equal to the overall width and depth of the lower frame rails 20.

The lower frame rail 20 is also utilized to support various subframe components that have to be attached to the frame rails for proper support thereof. Accordingly, as is best seen in all the drawings, but particularly in FIGS. 5-8, the lower frame rail 20 is manufactured to incorporate a subframe attachment mount 40 that is positioned at the centerline of the lower frame rail 20, as will be described in greater detail below. The subframe attachment mount 40 is formed with a flat mounting plate 44 with a cylindrical mounting member 42 projecting perpendicularly thereto. The center of the cylindrical mounting member 42 is preferably formed with a threaded bore 43.

To receive the subframe attachment member 40, each interior wall 49, 59 defining the internal vertical web 24 of the tubular members 21, 22 is formed with a semi-cylindrical depression 51, 52 that, when placed adjacent one another form a cylindrical pocket or cavity that is sized to receive the cylindrical mounting member 42. The formation of the semi-cylindrical depressions 51, 52 also causes the interior walls 49, 59 to be shaped in a semi-circular configuration to provide a stable support for the mounting plate 44. At the same time the semi-cylindrical depressions 51, 52 are being formed, an access opening 53 is formed on the lower surface of the lower frame rails 20 to be in alignment with the threaded bore 43 into the mounting member 42 to permit the engagement of the mounting member 42 with a fastener 46.

To allow for access of the mounting member 42 and the mounting plate 44 into the assembled lower frame rail 20, the exterior wall 58 and the interior wall 52 are formed or pierced with an opening 55 to accommodate the passage of the cylindrical member 42 into the interior of the lower frame rail 20. By only opening the exterior wall and the interior wall of the interior tubular member 22 for the passage of the subframe mounting member 42, the cylindrical mounting member 42 can be seated against the semi-cylindrical depression 51 formed into the exterior tubular member 21 to serve as a stop for positioning the mounting member 42.

An additional opening 56 is formed in both of the tubular members 21, 22 for the passage of the mounting plate 44. In the interior tubular member 22, the opening 56 is formed with the opening 55 to define a single opening for the passage of the subframe mount 40. The opening 56 for the mounting plate 44, however, extends through the semi-cylindrical depression 51 formed in the inner wall 49 and through the outer wall 48 so that the mounting plate 44 can be supported on each of the four walls 48, 49, 58, 59 of the lower frame midrail 20, and welded to at least the outer walls 48, 58 to secure the mounting plate 44 and affixed mounting member 42 to the lower frame midrail structure 20.

The subframe mount 40 is not limited in use to the lower frame midrail structure 20, but can be utilized in other frame configurations in which a pair of members can be formed with semi-cylindrical depressions to seat the cylindrical mounting member 42 and the support of the mounting plate 44 can be spread over at least two supports, such as the outer walls 48, 58.

In use, the subframe mount 40 is assembled as described above and welded into position on the frame structure 20. The subframe assembly to be supported from the frame 20 can then be attached to the frame structure 20 by a fastener 46 that passes through an external support member 45 and extends through an opening in the mounting plate 44 to engage the threaded bore 43 of the cylindrical member 42.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method of providing a subframe mount in an automotive frame member including a pair of laterally disposed tubular members, each of which has an inner wall and an outer wall, said inner walls being positioned adjacent one another to define an internal web in said automotive frame member, comprising the steps of:
   forming a semi-cylindrical depression in each of said inner walls;
   aligning said semi-cylindrical depressions to form a cylindrical pocket within said internal web; and
   positioning a cylindrical mounting member within said cylindrical pocket, said cylindrical mounting member being affixed to a mounting plate that is supported on each of said inner and outer walls.

2. The method of claim 1 further comprising the step of:
   establishing a first opening through each of said inner and outer walls in alignment for the passage of said mounting plate.

3. The method of claim 2 further comprising the step of:
   creating a second opening in one of said semi-cylindrical depressions and the corresponding said outer wall of one of said tubular members, said second opening being formed with said first opening.

4. The method of claim 3 wherein said positioning step includes the step of:
   passing said mounting plate and said cylindrical mounting member laterally through said first and second openings in said one semi-cylindrical depression and said outer wall of said one tubular member, the other said semi-cylindrical depression serving as a stop with respect to the lateral movement of said cylindrical mounting member.

5. The method of claim 4 further comprising the step of:
   welding said mounting plate to both said outer walls to secure said subframe mount to said frame member.

6. The method of claim 5 wherein a subframe member is connected to said subframe mount by engaging a fastener through an access opening through said frame member formed with the step of forming said semi-cylindrical depressions and being aligned with said cylindrical mounting member to engage a threaded bore within said cylindrical mounting member.

7. The method of claim 5 wherein said forming, establishing and creating steps are accomplished during a hydroforming process to form said tubular members.

8. A method of providing a subframe mount in an automotive frame member including a pair of laterally disposed hydroformed tubular members, each of which having an inner wall and an outer wall, said tubular members being welded together such that said inner walls are positioned adjacent one another to define an internal web in said automotive frame member, comprising the steps of:

forming a semi-cylindrical vertically oriented depression in said inner wall of each said tubular member, said semi-cylindrical depressions defining a cylindrical pocket within said internal web having an inlet therein accessible from externally of said frame member;

creating a first opening in said outer wall of one of said tubular members, said opening being located opposite of said depression, and a second opening in said inner wall into said depression, said first and second openings being aligned;

establishing a slot in said inner and outer walls of each said tubular member, said slots in said one tubular member being adjacent said first and second openings, respectively;

affixing a cylindrical mounting member to a mounting plate; and positioning said cylindrical mounting member and said mounting plate through said first and second openings and said slots to locate said cylindrical mounting member within said cylindrical pocket.

9. The method of claim 8 further comprising the step of:
supporting said mounting plate on said outer walls of each said tubular member.

10. The method of claim 9 further comprising the step of:
welding said mounting plate to said outer walls.

11. The method of claim 8 further comprising supporting said mounting plate on said inner walls of each said tubular member.

12. The method of claim 8 wherein said positioning step includes the step of:
passing said mounting plate and said cylindrical mounting member laterally through said first and second openings into said cylindrical pocket.

13. The method of claim 12 wherein said cylindrical mounting member is located against said inner wall of the other of said tubular members within said cylindrical pocket, said inner wall of said other tubular member serving as a stop with respect to the lateral movement of said cylindrical mounting member.

14. The method of claim 13 wherein said mounting plate is supported on both said inner and said outer walls of each of said tubular members.

15. The method of claim 14 further comprising the step of:
welding said mounting plate to both said outer walls to secure said subframe mount to said frame member.

16. The method of claim 15 wherein a subframe member is connected to said subframe mount by engaging a fastener through said inlet opening into said cylindrical pocket, said cylindrical mounting member being aligned with said inlet opening to permit said fastener to engage a threaded bore within said cylindrical mounting member.

17. A method of forming an automotive frame member with a subframe mount, comprising:

hydroforming a first tubular member with a semi-cylindrical depression in a first vertically oriented wall with a first opening in a second vertically oriented wall opposite said semi-cylindrical depression, with a second opening in said first wall into said semi-cylindrical depression, said first and second openings being aligned, and with a slot passing through each of said first and second walls adjacent said first and second openings, respectively;

hydroforming a second tubular member with a semi-cylindrical depression in a first vertically oriented wall with a slot passing through each of said first wall into said semi-circular depression and a second vertically oriented wall in alignment with said slot in said first wall of said second tubular member;

securing said first and second tubular members together such that said semi-circular depressions therein are opposed to form a cylindrical pocket, said first walls of said first and second tubular members forming an internal web for said automotive frame member, said slots in said first and second tubular members being aligned;

affixing a cylindrical mounting member to a mounting plate to define a subframe mount; and positioning said cylindrical mounting member and said mounting plate through said first and second openings and said slots to locate said cylindrical mounting member within said cylindrical pocket.

18. The method of claim 17 wherein said positioning step includes the step of:
passing said mounting plate and said cylindrical mounting member laterally through said first and second openings in first tubular member until said cylindrical mounting member rests against said first wall of said second tubular member within said cylindrical pocket, said first wall of said second tubular member serving as a stop with respect to the lateral movement of said cylindrical mounting member.

19. The method of claim 4 further comprising the step of:
supporting said mounting plate on said first and second walls of said first and second tubular members; and
welding said mounting plate to both said second walls to secure said subframe mount to said frame member.

20. The method of claim 19 wherein a subframe member is connected to said subframe mount by engaging a fastener through an access opening through said frame member formed with the step of forming said semi-cylindrical depressions and being aligned with said cylindrical mounting member to engage a threaded bore within said cylindrical mounting member.

* * * * *

UNITED STATES PATENT AND TRADEMARK OFFICE
CERTIFICATE OF CORRECTION

PATENT NO.        : 7,441,831 B2                                    Page 1 of 1
APPLICATION NO. : 11/838872
DATED             : October 28, 2008
INVENTOR(S)       : Ari Caliskan and Dean Gericke It is certified that error appears in the above-identified patent and that said Letters Patent is hereby corrected as shown below:

Title Page, Item (73) Assignee should read:

--(73) Assignee:

Ford GLobal Technologies, LLC of Dearborn, MI

Vari-Form, Inc. of Warren, MI--

Signed and Sealed this

Eighth Day of December, 2009

David J. Kappos
*Director of the United States Patent and Trademark Office*